United States Patent
Häfner et al.

(10) Patent No.: US 9,208,979 B2
(45) Date of Patent: Dec. 8, 2015

(54) HIGH VOLTAGE DC BREAKER APPARATUS

(75) Inventors: Jurgen Häfner, Ludvika (SE); Gunnar Asplund, Solna (SE)

(73) Assignee: ABB Technology AG, Zürich (CH)

( * ) Notice: Subject to any disclaimer, the term of this patent is extended or adjusted under 35 U.S.C. 154(b) by 104 days.

(21) Appl. No.: 13/643,945

(22) PCT Filed: May 11, 2010

(86) PCT No.: PCT/EP2010/056472
§ 371 (c)(1),
(2), (4) Date: Oct. 26, 2012

(87) PCT Pub. No.: WO2011/141054
PCT Pub. Date: Nov. 17, 2011

(65) Prior Publication Data
US 2013/0038975 A1 Feb. 14, 2013

(51) Int. Cl.
*H02H 3/00* (2006.01)
*H01H 33/59* (2006.01)
*H02H 3/08* (2006.01)
*H01H 9/54* (2006.01)
*H02H 3/02* (2006.01)
*H02H 9/02* (2006.01)

(52) U.S. Cl.
CPC ............. *H01H 33/596* (2013.01); *H01H 9/548* (2013.01); *H01H 2009/543* (2013.01); *H01H 2009/544* (2013.01); *H02H 3/025* (2013.01); *H02H 3/08* (2013.01); *H02H 9/025* (2013.01)

(58) Field of Classification Search
CPC ...................................................... H01H 9/542
USPC ...................................................... 361/18–13
See application file for complete search history.

(56) References Cited

U.S. PATENT DOCUMENTS

| | | | | |
|---|---|---|---|---|
| 5,164,872 A | * | 11/1992 | Howell | 361/3 |
| 5,452,170 A | * | 9/1995 | Ohde et al. | 361/13 |
| 5,999,388 A | * | 12/1999 | Asplund | 361/58 |
| 2005/0146814 A1 | * | 7/2005 | Sellier et al. | 361/8 |
| 2009/0201617 A1 | | 8/2009 | Yamaguchi | |
| 2011/0235375 A1 | | 9/2011 | Dommaschk et al. | |

FOREIGN PATENT DOCUMENTS

| | | | | |
|---|---|---|---|---|
| CN | 101505054 A | | 8/2009 | |
| DE | 10 2005 040 432 A1 | | 3/2007 | |
| JP | H05234471 A | | 9/1993 | |
| WO | WO 2009/149749 A1 | * | 12/2009 | H01H 33/59 |
| WO | WO 2010/025758 A1 | | 3/2010 | |

OTHER PUBLICATIONS

Meyer et al., DE 10 2005 040 432 A1 (English Translation), Mar. 2007, Paragraphs 0001-0030.*

* cited by examiner

*Primary Examiner* — Danny Nguyen
(74) *Attorney, Agent, or Firm* — Birch, Stewart, Kolasch & Birch, LLP

(57) ABSTRACT

A high voltage DC breaker apparatus configured to break a fault current occurring in a high voltage DC conductor includes a current limiting arrangement having at least one section with at least one semiconductor device of turn-off type and at least one arrester connected in parallel therewith, and a mechanical DC breaker connected in series with the current limiting arrangement and including a mechanical switch. The mechanical DC breaker is configured to enable breaking of a fault current in said DC conductor once said semiconductor devices of said arrangement have been turned off.

18 Claims, 2 Drawing Sheets

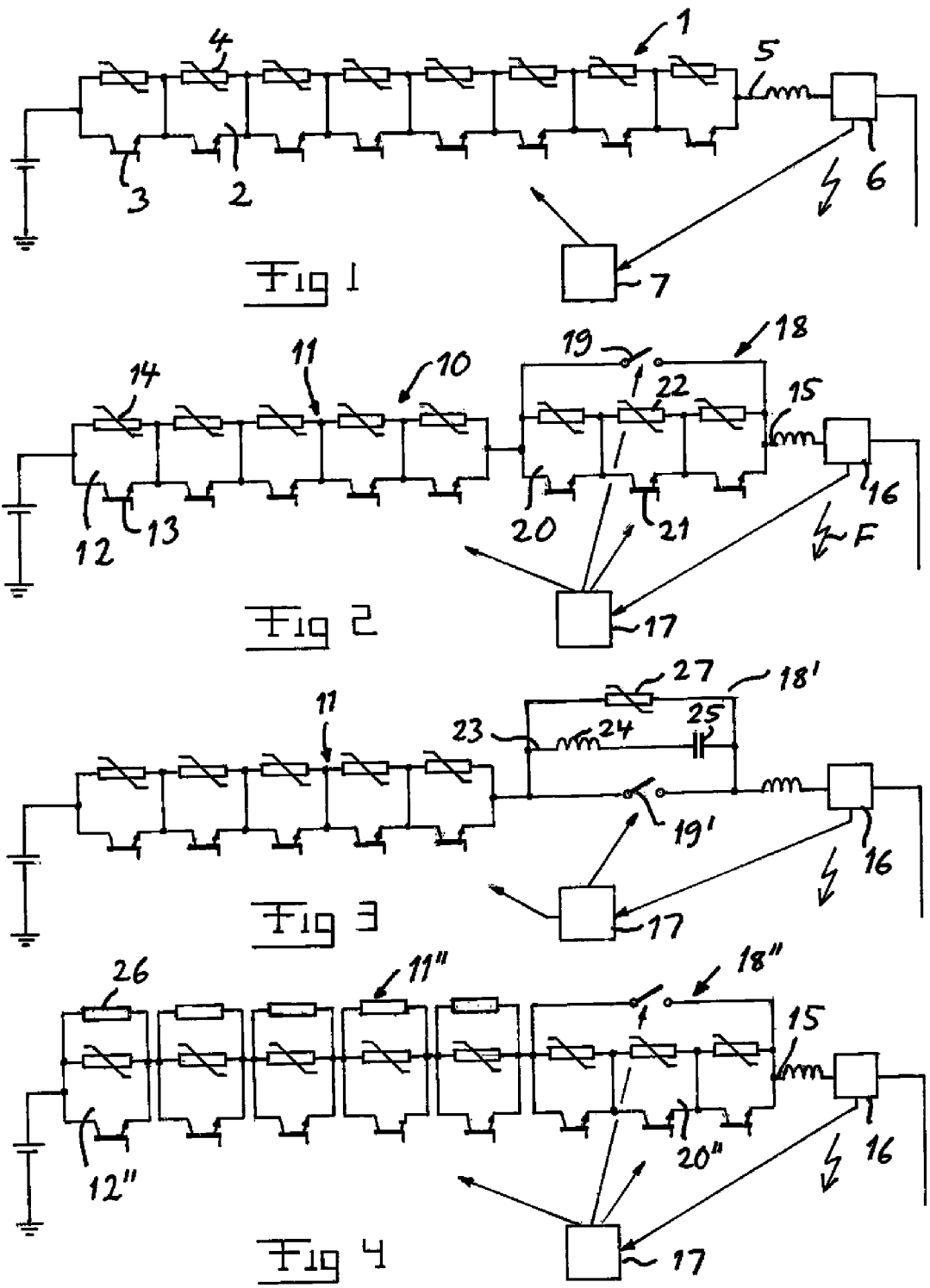

HIGH VOLTAGE DC BREAKER APPARATUS

FIELD OF THE INVENTION AND BACKGROUND ART

The invention relates to a high voltage DC breaker apparatus configured to break a fault current occurring in a high voltage DC conductor, said apparatus comprising
- a current limiting arrangement having at least one section with at least one semiconductor device of turn-off type and at least one arrester connected in parallel therewith, said at least one section being configured to be connected in series with said DC conductor,
- means configured to detect occurrence of a fault current in said DC conductor, and
- a unit configured to control breaking of said fault current upon detection of occurrence thereof, said control including turning off all semiconductor devices of said arrangement.

High voltage means a voltage ≥10 kV and often a voltage of several hundreds kV with respect to ground.

Such a high voltage DC breaker apparatus may be arranged in a high DC voltage carrying system for obtaining breaking of fault currents occurring in a said DC conductor, in general as a consequence of short circuits to earth. It is then of great importance to be able to at a very short notice, such as in the order of a few hundreds μs, upon occurrence of such a fault current limit this fault current for preventing severe impacts upon equipment connected to the system, which is the reason for using semiconductor devices of turn-off type, which may open within a few μs, as switches in a current limiting arrangement of such a breaker apparatus.

An apparatus of this type is known through U.S. Pat. No. 5,999,388 and a similar known such apparatus is shown in appended FIG. 1, in which the current limiting arrangement 1 has eight sections 2 connected in series, and each section has at least one semiconductor device of turn-off type 3, here an IGBT (Insulated Gate Bipolar Transistor) and at least one arrester 4 connected in parallel therewith. Each IGBT symbol may in fact stand for a large number, such as 10, of IGBT:s connected in series, and the same may apply to the arrester 4. A rectifying member in the form of at least one diode will also be connected in antiparallel with each semiconductor device shown in the figures of this disclosure. However, these diodes have for simplicity reasons been omitted in the figures. The arrangement 1 is configured to be connected in series with a DC conductor 5 on high voltage potential. It is shown how the apparatus has means 6 for detecting occurrence of a fault current in the DC conductor and sending information thereabout to a control unit 7 configured to control breaking of said fault current by controlling the semiconductor devices 3.

Turning off the IGBT:s 3 of an individual section 2 during a fault inserts the corresponding arrester 4 into the line. The voltage across the section is given, almost independent of the fault current, by the protective level of that arrester or arrester bank (plurality of arresters) of said section. Assuming that the protective voltage level of the complete arrangement shown in FIG. 1 corresponds to 1.60 times the DC voltage intended for the DC conductor, insertion of more than five arresters (arrester banks) will reduce the fault current. Insertion of five arrester banks will limit the fault current to the current level at the breaking time instance.

Although such solid state DC breakers, i.e. based on semiconductor switches, respond almost instantaneously to the demand of the control and protection system, a disadvantage of such a breaker apparatus is that it has a large number of semiconductor devices, such as IGBT:s, to be connected in series for being able to take a voltage corresponding to the protective voltage of the arrester banks, which results in considerable costs and also power transfer losses when the current of the DC conductor flows through the semiconductor devices.

The losses of mechanical DC breakers, based on standard AC breakers as found in High Voltage Direct Current applications, are in comparison to this very small. The disadvantage of such existing mechanical DC breaker solutions is, however, the time delay between the control signal from the protection system and the breaking action. Even with a modified standard AC breaker it will take 10-20 ms until the mechanical contacts are opened, which is too slow for application in a high voltage DC conductor, such as in a DC grid. This is the reason why solid state DC breakers with the appearance shown in FIG. 1 have been used so far for realizing high voltage DC breaker apparatuses.

SUMMARY OF THE INVENTION

The object of the present invention is to provide a high voltage DC breaker apparatus of the type defined in the introduction being improved in at least some aspect with respect to such apparatuses already known.

This object is according to the invention obtained by providing such an apparatus, which further comprises a mechanical DC breaker connected in series with said current limiting arrangement and including a mechanical switch, and said mechanical DC breaker is configured to enable breaking of a fault current in said DC conductor once said semiconductor devices of said arrangement have been turned off.

This means that during normal conditions, i.e. in absence of a fault, the current in said DC conductor will flow through the semiconductor devices of the current limiting arrangement and said mechanical switch. By the fact that said mechanical DC breaker is configured to enable breaking of a fault current the semiconductor devices of said current limiting arrangement has only to accomplish limiting of the fault current and not breaking thereof, so that the protective voltage level of said current limiting arrangement may be reduced with respect to an apparatus of the type shown in FIG. 1. This means a lower number of semiconductor devices, such as IGBT:s, connected in series. This will then result in a significant reduction of power transfer losses in said apparatus during normal conducting conditions.

According to an embodiment of the invention the protective voltage level of said arrangement defined by said at least one arrester is a DC voltage intended for a DC conductor with respect to ground ±10%. This may be compared with a typical protective voltage level of an apparatus according to FIG. 1 in the order of 150-160% of the DC voltage for which the DC conductor is intended. Thus, the number of semiconductor devices connected in series in said current limiting arrangement and by that the power transfer losses of such an apparatus may be reduced in the order of 40%.

According to another embodiment of the invention said at least one section has a plurality of said semiconductor devices connected in series and jointly controllable through said control unit. In the case of a breaker being configured to be connected to a DC conductor carrying very high voltages, such as above 100 kV, it is suitable and sometimes even necessary to have a comparatively high number, such as well ten or more, semiconductor devices connected in series for obtaining the protective voltage level to be obtained by said section. When these are jointly controllable they will act as one single semiconductor device, i.e switch.

According to another embodiment of the invention said arrangement comprises a plurality of said sections independently controllable by said control unit by controlling said at least one semiconductor device thereof. This makes it possible to chose the current limiting action of the current limiting arrangement for possible adaption to the feature of a fault occurring.

According to another embodiment of the invention said mechanical DC breaker comprises, connected in parallel with said mechanical switch, at least one module having at least one semiconductor device of turn-off type and at least one arrester connected in parallel therewith, and said control unit is configured to control breaking of a said fault current by controlling the mechanical DC breaker in the following order: turning on the semiconductor devices of said at least one module, opening said mechanical switch for commutating the fault current to flow through the semiconductor devices last mentioned and turning these semiconductor devices off. Power transfer losses may in such an apparatus be reduced with respect to known apparatuses according to FIG. 1, since current will during normal operation only flow through the semiconductor devices of the current limiting arrangement, but the same possibility to break fault currents will still be obtained thanks to the semiconductor devices connected in parallel with the mechanical switch.

According to another embodiment of the invention a protective voltage level of the arrester of said at least one module of the mechanical DC breaker is 30-80% of the DC voltage intended for a said DC conductor with respect to ground. Thus, this means a corresponding possible reduction of said power transfer losses in the semiconductor devices of the apparatus during normal operation of the system to which the DC conductor belongs.

According to another embodiment of the invention said at least one module of said mechanical DC breaker has a plurality of semiconductor devices connected in series and jointly controllable through said control unit. The motivation for this feature and the feature that said mechanical DC breaker comprises a plurality of said modules according to another embodiment of the invention appear from the above discussion.

According to another embodiment of the invention said mechanical DC breaker has a series connection of an inductance and a capacitance connected in parallel with said mechanical switch, and the control unit is configured to control breaking of said fault current by opening said mechanical switch. The use of such a classical DC breaker as said mechanical DC breaker connected in series with the current limiting arrangement in a high voltage DC breaker apparatus has not only a reduction of power transfer losses during normal operation with respect to known such apparatuses as a result, but the total number of semiconductor devices with respect to such a known apparatus is also reduced, which may have a noticeable positive influence upon the costs of the apparatus and also simplify the control scheme thereof.

According to another embodiment of the invention said at least one section of said current limiting arrangement has a resistor connected in parallel with each arrester of said arrangement, and the protective voltage level of said mechanical DC breaker is 100%-200% of the DC voltage intended for a said DC conductor. The arrangement of such resistors then used for dissipating power may then result in cost efficient increase of the energy absorbing capability of the apparatus upon fault occurrence.

According to another embodiment of the invention said semiconductor device/devices is/are an IGBT/IGBT:s, a GTO/GTO:s or an IGCT/IGCT:s. Such Insulated Gate Bipolar Transistors, Gate Turn Off thyristors and Integrated Gate-Commutated Thyristors are suitable semiconductor devices of turn-off type for an apparatus of this type.

According to another embodiment of the invention the apparatus is configured to break a fault current occurring in a high voltage DC conductor intended to be on a voltage level of 10 kV, 10 kV-1000 kV, 100 kV-1000 kV or 300 kV-1000 kV with respect to ground.

According to another embodiment of the invention the apparatus is configured to be connected to a said high voltage DC conductor in an AC/DC converter station, which is one suitable application and location of such an apparatus, and it may then according to another embodiment of the invention be configured to be arranged in a DC grid for protecting equipment connected thereto.

The invention also relates to a plant for transmitting electric power through High Voltage Direct Current, which is characterized in that it is provided with a DC breaker apparatus according to the invention. Such a plant may benefit from the positive features mentioned above of such an apparatus.

The invention also relates to a method for controlling a high voltage DC breaker apparatus according to the invention so as to break a fault current detected in said high voltage DC conductor according to the appended independent method claim as well as an embodiment thereof defined in the dependent method claim. Also the advantages of such a method appear clearly from the above discussion of an apparatus according to the present invention in comparison with known such apparatuses.

Further advantages as well as advantageous features of the invention will appear from the following description.

BRIEF DESCRIPTION OF THE DRAWINGS

With reference to the appended drawings, below follows a specific description of embodiments of the invention cited as examples.

In the drawings:

FIG. 1 is a very schematical view illustrating a known high voltage DC breaker apparatus connected to break a fault current occurring in a high voltage DC conductor, FIG. 2 is a view corresponding to FIG. 1 of an apparatus according to a first embodiment of the invention, FIG. 3 is a view corresponding to FIG. 1 of an apparatus according to a second embodiment of the invention, FIG. 4 is a view corresponding to FIG. 1 of an apparatus according to a third embodiment of the invention.

DETAILED DESCRIPTION OF EMBODIMENTS OF THE INVENTION

Figure 5:
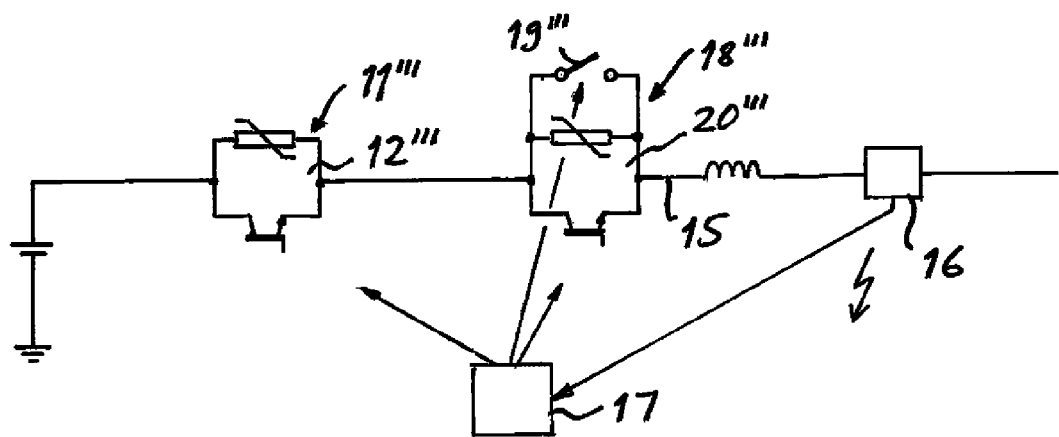
FIG. 5 is a view illustrating a very simplified apparatus according to a fourth possible embodiment of the invention.

A high voltage DC breaker apparatus 10 according to an embodiment of the present invention is schematically illustrated in FIG. 2. This apparatus comprises a current limiting arrangement 11 having five sections 12 with at least one semiconductor device 13 of turn-off type, here an IGBT, and at least one arrester 14 connected in parallel therewith. The five sections 12 are connected in series and configured to be connected in series with a high voltage DC conductor 15 for which the apparatus is configured to break a fault current when occurring therein. Each IGBT symbol 13 may stand for a plurality of IGBT:s connected in series and jointly controlled to function as one single semiconductor switch.

The apparatus also has means 16 configured to detect occurrence of a fault current in the DC conductor 15, and such a fault current occurrence is indicated by the arrow F.

The apparatus also comprises a unit 17 configured to control breaking of said fault current upon detection of occurrence thereof, in which this control includes turning off of all the semiconductor device of the current limiting arrangement.

The breaker apparatus according to the invention also comprises a mechanical DC breaker 18 connected in series with the current limiting arrangement 11 and having a mechanical switch 19, the operation of which is also controlled by said control unit 17. The mechanical DC breaker has, connected in parallel with said mechanical switch 19, three modules 20 of at least one semiconductor device 21 of turn-off type, here an IGBT, and at least one arrester 22 connected in parallel therewith. These modules 20 of the mechanical DC breaker are configured to enable breaking of a fault current in the DC conductor once the semiconductor devices 13 of the current limiting arrangement 11 have been turned off.

The operation of the high voltage DC breaker apparatus shown in FIG. 2 will now be explained. In normal operation current in the DC conductor 15 will flow through the semiconductor devices 13 then turned on of the current limiting arrangement 11 and through the mechanical switch 19 then closed of the mechanical DC breaker. This will result in lower power transfer losses than in a corresponding apparatus shown in FIG. 1, in which the current will flow through a higher number of semiconductor devices. When a fault current occurs F and is detected by said means 16 the control unit 17 will first of all control the semiconductor devices 13 of at least some of the sections 12 to be turned off, which means that the protective voltage of these sections will be applied for counteracting a fault current which may damage equipment connected to the DC conductor 15. The protective voltage level of the current limiting arrangement is preferably the DC voltage intended for the DC conductor with respect to ground ±10%, and if we assume that this protective voltage level is the same as the voltage of the DC conductor with respect to ground a turning off of the semiconductor devices of all sections 12 may in a few μs limit the fault current to an acceptable level. The control unit will then control the mechanical switch 19 to open while simultaneously ensuring that the semiconductor devices 21 of the modules 20 of the mechanical DC breaker are turned on. Opening of the mechanical switch 19 will take some ms after the moment of detection of the fault and will result in a commutation of the current flowing therethrough to flow through the semiconductor devices 21 connected in parallel therewith instead.

The protective voltage level of the modules 20 defined by the arresters 22 thereof will be 30-80%, preferably in the order of 50%, of the DC voltage intended for the DC conductor with respect to ground, which means that the control unit 17 may then obtain breaking of the current through the apparatus by controlling the semiconductor devices 21 to be turned off. However, thanks to the current limiting arrangement it may after opening the mechanical switch 19 be waited for carrying out this action so long that breaking may be avoided should the detection made by said means 16 not have been a result of a real fault in the form of a short-circuit to earth.

A high voltage DC breaker apparatus according to a second embodiment of the invention is schematically illustrated in FIG. 3 and differs from the one shown in FIG. 2 by the design of the mechanical DC breaker 18'. This DC breaker has an LC-circuit 23 with an inductance 24 and a possibly pre-charged capacitance 25 connected in parallel with the mechanical switch 19' and an arrester 27 connected in parallel with the LC-circuit. The control unit 17 is here configured to control breaking of a said fault current by opening said mechanical switch 19' after having turned off the semiconductor devices 13 of the current limiting arrangement as for the embodiment shown in FIG. 2. The lower number of semiconductor devices required in the apparatus according to FIG. 3 with respect to the one according to FIG. 2 may result in a reduction of costs and a simplifying of the control of the apparatus.

A high voltage DC breaker apparatus according to a third embodiment of the invention is schematically illustrated in FIG. 4 and differs from the one according to FIG. 2 only by the fact that each section 12" of the current limiting arrangement 11" has a resistor 26 connected in parallel with each arrester, so that power losses resulting from a high fault current may be dissipated through the resistors, so that a cost efficient increase of the energy absorbing capability of the apparatus is thus obtained. In this case the protective voltage level of the current breaking part, i.e. the mechanical DC breaker 18", must exceed the DC voltage level of the conductor 15 with respect to ground, and a typical such protective voltage level is 150% of the latter.

Finally, FIG. 5 schematically illustrates the most simple design of a high voltage DC breaker apparatus according to the present invention, which has a current limiting arrangement 11''' with only one said section 12''' and a mechanical DC breaker 18''' connected in series therewith and having a mechanical switch 19''' and a current breaking part 20''' in parallel therewith, which here is a said section. However, it is pointed out that the mechanical DC breaker may be of any conceivable type, such as a classical DC breaker according to the embodiment shown in FIG. 3 or a breaker according to any other mechanical DC breaker concept.

A high voltage DC breaker apparatus according to the present invention is preferably arranged in an AC/DC converter station on the DC-side of a converter thereof close to this converter or in a DC switchyard. This converter station may be a part of a plant for transmitting electric power through High Voltage Direct Current, which in its turn may include a DC grid formed by high voltage DC conductors, such as long distance high voltage cables, interconnected.

The invention is of course not in any way restricted to the embodiments described above, but many possibilities to modifications thereof will be apparent to a person with ordinary skill in the art without departing from the scope of the invention as defined in the appended claims.

A semiconductor device of turn-off type, such as an IGBT, may be connected in series with the mechanical switch and in parallel with the semiconductor devices, which are connected in parallel with said switch, in the embodiments shown in FIGS. 2, 4 and 5 for simplifying commutation of a fault current from the mechanical switch path into the path of the semiconductor devices last mentioned.

The invention claimed is:

1. A high voltage DC breaker apparatus configured to break a fault current occurring in a high voltage DC conductor, said apparatus comprising:
   a current limiting arrangement having at least one section with at least one semiconductor device of turn-off type and at least one arrester connected in parallel therewith, said at least one section is connected in series with said DC conductor,
   a fault current detector configured to detect occurrence of a fault current in said DC conductor, a control unit configured to control breaking of said fault current upon detection of occurrence thereof, said control including turning off all semiconductor devices of said arrangement, and a mechanical DC breaker connected in series with said current limiting arrangement and including a mechanical switch, at least one module having at least one semiconductor device of turn-off type, and at least one arrester, wherein the mechanical switch, the at least one module and the at least one arrester are connected in parallel with each other such that a first terminal of each of the mechanical switch, the at least one module, and the at least one arrester are connected together, and a second terminal of each of the mechanical switch, the at least one module, and the at least one arrester are connected together, wherein a combination of the mechanical switch, the at least one module and the at least one arrester as a whole is connected in series with said current limiting arrangement, such that the first terminal of each of the mechanical switch, the at least one module, and the at least one arrester is directly connected to an output terminal of the current limiting arrangement, wherein said control unit is configured to control said mechanical DC breaker and open the mechanical switch to enable breaking of a fault current in said DC conductor once said semiconductor devices of said current limiting arrangement have been turned off, wherein said control unit is configured to control breaking of a said fault current by controlling the mechanical DC breaker in the following order: turning on the semiconductor devices of said at least one module, opening said mechanical switch for commutating the fault current to flow through the semiconductor devices last mentioned and turning these semiconductor devices off.

2. The apparatus according to claim 1, wherein the protective voltage level of said arrangement defined by said at least one arrester is a DC voltage intended for a said DC conductor with respect to ground ±10%.

3. The apparatus according to claim 1, wherein each said at least one section has a plurality of said semiconductor devices connected in series and jointly controllable through said control unit.

4. The apparatus according to claim 1, wherein said arrangement comprises a plurality of said sections individually controllable by said control unit by controlling said at least one semiconductor device thereof.

5. The apparatus according to claim 1, wherein the protective voltage level of the arrester of said at least one module of the mechanical DC breaker is 30-80% of the DC voltage intended for a said DC conductor with respect to ground.

6. The apparatus according to claim 1, wherein said at least one module of said mechanical DC breaker has a plurality of semiconductor devices connected in series and jointly controllable through said control unit.

7. The apparatus according to claim 1, wherein said mechanical DC breaker comprises a plurality of said modules.

8. The apparatus according to claim 1, wherein said at least one section of said current limiting arrangement has a resistor connected in parallel with each arrester of said arrangement, and that the protective voltage level of said mechanical DC breaker is 100%-200% of the DC voltage intended for a said DC conductor.

9. The apparatus according to claim 1, wherein said semiconductor device/devices is/are an IGBT/IGBT:s, a GTO/GTO:s or an IGCT/IGCT:s.

10. The apparatus according to claim 1, wherein the apparatus is configured to break a fault current occurring in a high voltage DC conductor intended to be on a voltage level of ≥10 kV, 10 kV-1000 kV, 100 kV-1000 kV or 300 kV-1000 kV with respect to ground.

11. The apparatus according to claim 1, wherein the apparatus is configured to be connected to a said high voltage DC conductor in an AC/DC converter station.

12. The apparatus according to claim 1, wherein the apparatus is configured to be arranged in a DC grid for protecting equipment connected thereto.

13. A plant for transmitting electric power through High Voltage Direct Current, wherein the plant is provided with a DC breaker apparatus according to claim 1.

14. A method for controlling a high voltage DC breaker apparatus according to claim 1 so as to break a fault current detected in said high voltage DC conductor, the method comprising:
a) turning the semiconductor devices of said current limiting arrangement off, and
b) controlling said mechanical DC breaker to break the fault current.

15. The method according to claim 14, wherein is the method is applied on an apparatus in which said mechanical DC breaker comprises, connected in parallel with said mechanical switch, at least one module having at least one semiconductor device of turn-off type and at least one arrester connected in parallel therewith,
and the step b) includes the following sub steps:
c) turning the semiconductor devices of said at least one module of the mechanical DC breaker on,
d) opening said mechanical switch for commutating the current flowing through said mechanical switch to flow through said semiconductor devices last mentioned, and
e) turning said semiconductor devices of said module of the mechanical DC breaker off for breaking said fault current.

16. The apparatus according to claim 2, wherein each said at least one section has a plurality of said semiconductor devices connected in series and jointly controllable through said control unit.

17. The apparatus according to claim 2, wherein said arrangement comprises a plurality of said sections individually controllable by said control unit by controlling said at least one semiconductor device thereof.

18. The apparatus according to claim 3, wherein said arrangement comprises a plurality of said sections individually controllable by said control unit by controlling said at least one semiconductor device thereof.

* * * * *